US009388875B2

(12) United States Patent
Hagelin et al.

(10) Patent No.: US 9,388,875 B2
(45) Date of Patent: Jul. 12, 2016

(54) AEROELASTIC TUNED MASS DAMPER

(75) Inventors: Jack S. Hagelin, Woodinville, WA (US);
Sascha K. Ruegamer, Seattle, WA (US);
Tim D. Thornton, Bothell, WA (US);
Sean C. O'Meara, Seattle, WA (US);
Jeffrey R. Ellis, Snohomish, WA (US);
E. Fred Gylland, Jr., Tukwila, WA (US)

(73) Assignee: The Boeing Company, Chicago, IL (US)

( * ) Notice: Subject to any disclaimer, the term of this patent is extended or adjusted under 35 U.S.C. 154(b) by 670 days.

(21) Appl. No.: 13/276,120

(22) Filed: Oct. 18, 2011

(65) Prior Publication Data

US 2013/0092489 A1    Apr. 18, 2013

(51) Int. Cl.
*F16F 7/116*    (2006.01)
*F02C 7/00*    (2006.01)

(52) U.S. Cl.
CPC . *F16F 7/116* (2013.01); *F02C 7/00* (2013.01); *F05D 2260/96* (2013.01); *Y02T 50/671* (2013.01)

(58) Field of Classification Search
CPC ............ F16F 7/10; F16F 7/104; F16F 7/112; F16F 7/116; F16F 7/109
USPC .......................................... 188/378, 379, 380
See application file for complete search history.

(56) References Cited

U.S. PATENT DOCUMENTS

| | | | | |
|---|---|---|---|---|
| 2,685,822 A * | 8/1954 | Walton | | 89/44.01 |
| 2,797,931 A * | 7/1957 | Hans | | B62D 37/04 188/380 |
| 2,846,844 A * | 8/1958 | O'Rourke | | 239/127.3 |
| 2,854,100 A * | 9/1958 | Oiley et al. | | 188/316 |
| 2,865,651 A * | 12/1958 | Chayne | | B60G 13/16 188/2 R |
| 3,173,514 A * | 3/1965 | Tiedemann | | F16F 7/112 188/322.5 |
| 3,259,212 A * | 7/1966 | Nishioka et al. | | 188/378 |
| 3,310,138 A * | 3/1967 | Reed, III | | 188/322.5 |
| 3,327,965 A * | 6/1967 | Bockrath | | 244/54 |
| 4,238,104 A * | 12/1980 | Hamilton | | 248/566 |
| 4,582,013 A * | 4/1986 | Holland, Jr. | | 114/39.3 |
| 4,717,094 A * | 1/1988 | Chee | | 244/54 |
| 4,725,019 A * | 2/1988 | White | | 244/54 |
| 4,917,331 A | 4/1990 | Hager et al. | | |
| 5,054,715 A | 10/1991 | Hager et al. | | |
| 5,199,856 A * | 4/1993 | Epstein et al. | | 417/312 |
| 5,261,605 A * | 11/1993 | McLafferty et al. | | 239/265.35 |
| 5,445,249 A * | 8/1995 | Aida | | F16F 15/03 188/267 |
| 5,687,948 A | 11/1997 | Whiteford et al. | | |
| 5,713,163 A * | 2/1998 | Mutaguchi | | B61B 12/04 114/121 |
| 5,816,373 A * | 10/1998 | Osterberg et al. | | 188/380 |
| 5,890,675 A | 4/1999 | Lacabanne et al. | | |
| 6,019,056 A * | 2/2000 | Maeda | | B63B 39/02 114/122 |
| 6,102,664 A * | 8/2000 | Nguyen | | 416/248 |
| 6,189,830 B1 * | 2/2001 | Schnelz et al. | | 244/54 |
| 6,196,529 B1 * | 3/2001 | Shtarkman | | F16F 9/53 267/140.14 |
| 6,299,410 B1 * | 10/2001 | Hilbert et al. | | 416/145 |
| 6,607,161 B1 * | 8/2003 | Krysinski et al. | | 244/7 A |

(Continued)

*Primary Examiner* — Robert A Siconolfi
*Assistant Examiner* — James Hsiao
(74) *Attorney, Agent, or Firm* — Felix L. Fischer

(57) ABSTRACT

A method for damping aeroelastic modes, including limit cycle oscillations (LCO), is implemented by determining a mass for a tuned mass damper (TMD) based on an modal frequency for a mode having a potentially positive growth rate and attaching a TMD to at least one attachment point with significant motion such that a damping axis of the tuned mass damper is substantially oriented in a direction aligned with the local modal deflection.

14 Claims, 15 Drawing Sheets

(56) References Cited

U.S. PATENT DOCUMENTS

| | | | |
|---|---|---|---|
| 6,681,908 B2* | 1/2004 | Davis | 188/380 |
| 7,191,985 B2 | 3/2007 | Najmabadi et al. | |
| 7,206,709 B2* | 4/2007 | Griffin et al. | 702/85 |
| 7,410,039 B2* | 8/2008 | Or et al. | 188/380 |
| 7,506,839 B2* | 3/2009 | Conner | 244/53 B |
| 7,882,941 B2* | 2/2011 | Rozema | 188/293 |
| 8,002,094 B2* | 8/2011 | Ruebsamen et al. | 188/379 |
| 8,256,750 B2* | 9/2012 | Cottrell et al. | 267/136 |
| 8,272,786 B2* | 9/2012 | Cottrell | B64D 27/26 188/298 |
| 8,702,377 B2* | 4/2014 | Cottrell | F01D 25/04 415/119 |
| 8,991,574 B2* | 3/2015 | Provost | F16F 7/116 188/268 |
| 2002/0060268 A1* | 5/2002 | Smith et al. | 244/54 |
| 2003/0127295 A1* | 7/2003 | Davis | 188/316 |
| 2006/0175169 A1* | 8/2006 | Or et al. | 188/379 |
| 2008/0156602 A1* | 7/2008 | Hiemenz | B60N 2/4242 188/267.1 |
| 2008/0295545 A1* | 12/2008 | Kim | D06F 37/20 68/23.1 |
| 2008/0308366 A1* | 12/2008 | Rozema | 188/291 |
| 2009/0099796 A1* | 4/2009 | Yang et al. | 702/56 |
| 2010/0101906 A1* | 4/2010 | Herold | F16F 7/1011 188/379 |
| 2011/0193427 A1* | 8/2011 | Lemieux | F03G 7/08 310/25 |
| 2011/0193428 A1* | 8/2011 | Lemieux | H02K 35/02 310/25 |
| 2011/0260380 A1* | 10/2011 | Hollander et al. | 267/175 |

* cited by examiner

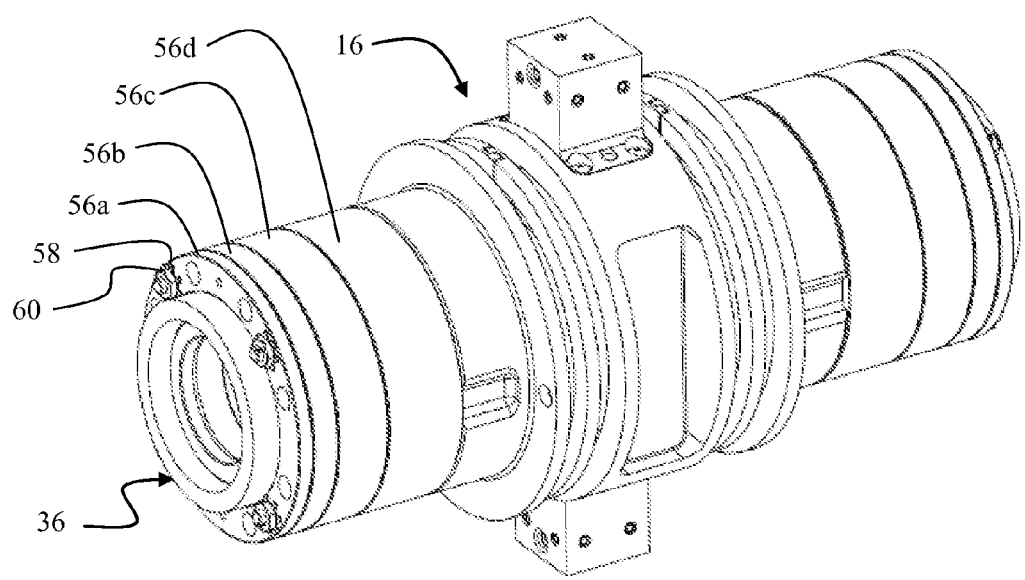
FIG. 6
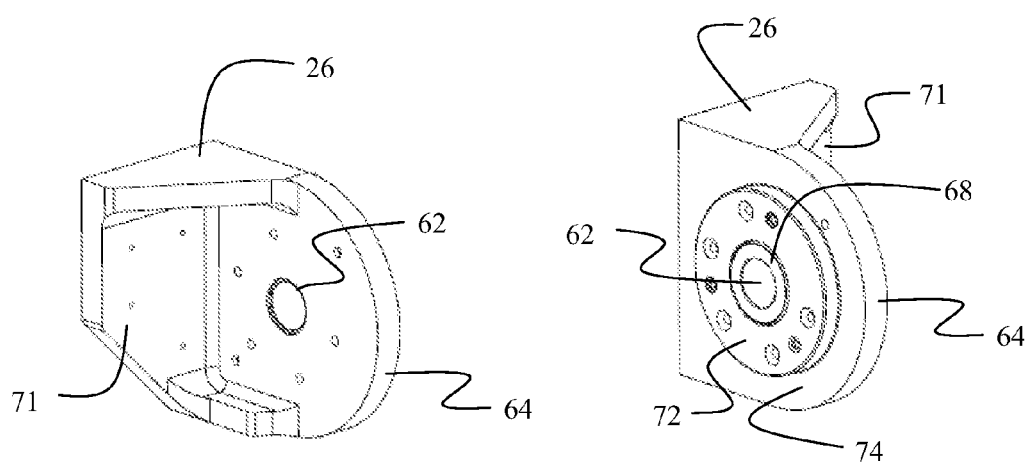
FIG. 7A
FIG. 7B

US 9,388,875 B2

AEROELASTIC TUNED MASS DAMPER

BACKGROUND INFORMATION

1. Field

Embodiments of the disclosure relate generally to the field of vibration reduction systems for aircraft and more particularly to a plurality of tuned mass dampers having viscous damping and mounted in multiple locations on the airframe with directional orientation determined to maximize damping of primary modes of aeroelastic limit cycle oscillation.

2. Background

Large modern commercial jet aircraft are designed with consideration of the aeroelastic stability of the aircraft. However, in certain cases aeroelastic designs may be subject to resonant oscillations created under certain aerodynamic conditions and at various speeds. Such oscillations can be localized in certain portions of the airframe or may be whole airframe aeroelastic modes including limit cycle oscillations (LCO) involving the nacelles, wing and fuselage.

To minimize LCO, prior art aeroelastic solutions include payload and/or fuel restrictions, active modal suppression using control surfaces, adding ballast, vortex generators to change aerodynamic flow characteristics and structural changes (such as adding wing stiffness). Payload or fuel restrictions will typically reduce capability of the aircraft while active modal suppression requires extensive design and experimentation resulting in extended design lead time and may also affect performance. Use of ballast results in a significant increase in weight which may affect performance and may drive structural changes and inherent structural changes for stiffness also typically add weight. Vortex generators, while often effective for localized oscillation suppression are not typically effective for full airplane LCO It is therefore desirable to provide modal damping to satisfy aeroelastic stability and vibration requirements with low cost, simple design elements with minimized weight increase and no performance impact.

SUMMARY

Embodiments disclosed herein provide a method for damping aeroelastic modes including whole airframe limit cycle oscillations (LCO) implemented by determining a mass for a tuned mass damper (TMD) based on a LCO aeroelastic mode frequency having a potentially positive growth rate and attaching a TMD to an attachment point such that a damping axis of the tuned mass damper is substantially oriented in a direction aligned with the modal deflection at a location having significant motion.

In an example embodiment for the TMD, a tuned mass assembly incorporating a primary mass and tuning masses is concentrically mounted on a shaft with opposing concentric springs with a viscous damper for the tuned mass. The viscous damper includes magnets mounted on the tuned mass assembly and a case having a conductive, non-magnetic, surface mounted concentrically to the shaft adjacent the magnets for generation of eddy currents. The shaft is supported by end caps mounted to the aircraft attachment point. In one embodiment, one or more TMDs are mounted in aircraft nacelles for reciprocation on an axis oriented in an inboard and outboard direction.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

FIG. 6 is an isometric view of the translating mass buildup;

FIG. 7A is an isometric view of the left end cap;

FIG. 7B is an isometric view of the right end cap showing the shaft capture bushing;

DETAILED DESCRIPTION

Embodiments disclosed herein provide a tuned mass damper (TMD) to dampen aeroelastic modes involving the complete primary structure including whole airframe limit cycle oscillation (LCO) vibration involving the powerplant, wing and fuselage. In an example embodiment, the tuned mass damper is attached to the nacelle in the region of the lower fan case. In alternative embodiments, the damper may be attached to one or more of the airplane nacelles, (or other locations on the airframe). For the embodiment described in detail subsequently, the TMD is located in the lower forward nacelle inlet cowl in a horizontal position with inboard and outboard motion of the mass to maximize effectiveness for an airplane LCO mode which has significant displacement at this location and direction. The TMD frequency is equal to the modal frequency for which suppression is desired. The mass is mounted to move with minimal Coulomb friction and is provided with an optimized amount of viscous damping (proportional to velocity of the mass in the TMD and ~2 to 5% for the example embodiment). The viscous damping may be obtained by means of pneumatics, hydraulics, or as in this embodiment, magnetic braking.

Figure 1:
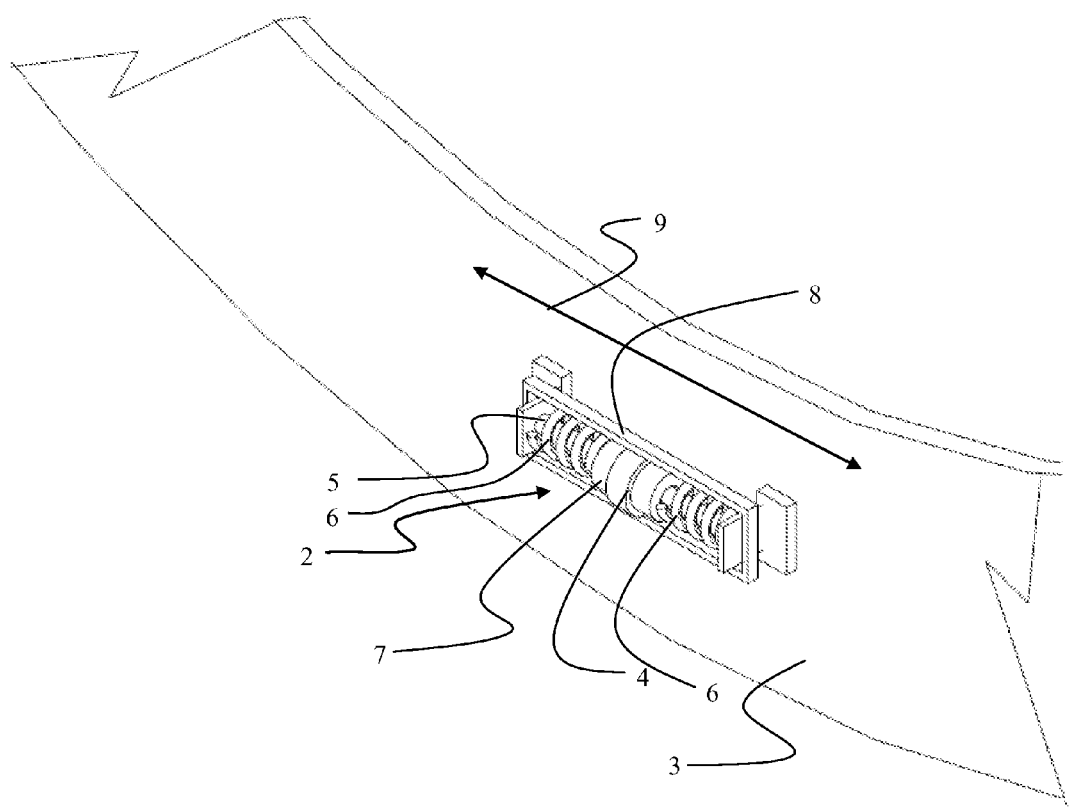
FIG. 1 is a schematic pictorial view of a TMD for aeroelastic mode damping.

FIG. 1 shows a production TMD 2 as implemented for a particularly defined aeroelastic mode and direction. The TMD 2 is mounted to an inlet bulkhead 3 in an engine nacelle for a large commercial aircraft. TMD 2 incorporates a primary mass 4 mounted on a shaft 5. The mass 4 is constrained by springs 6 for reciprocal motion with the combination of weight of the mass and the spring constant of the springs defining a tuned frequency. Viscous damping is achieved with a magnetic element 7 which reacts with a conductive surface 8 adjacent and parallel to the directional motion of the mass creating eddy currents. In alternative embodiments, hydraulic or pneumatic systems associated with the mass for creation of the desired viscous damping.

Figure 2:
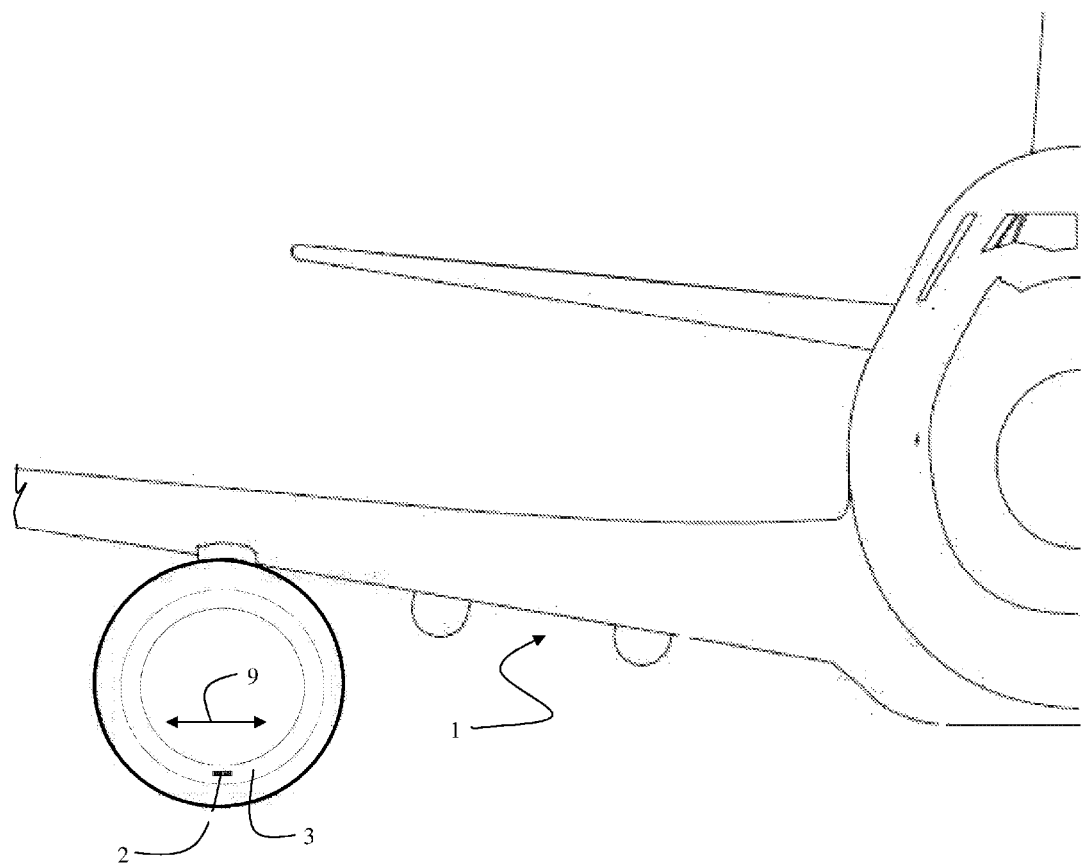
FIG. 2 is a detailed schematic cutaway of the TMD of FIG. 1.

The overall position of the TMD 2 in the aircraft 1 is shown in FIG. 2 with relative positioning of the inlet bulkhead 3 and showing the inboard and outboard direction of oscillation of the TMD with arrow 9.

Figure 3A:
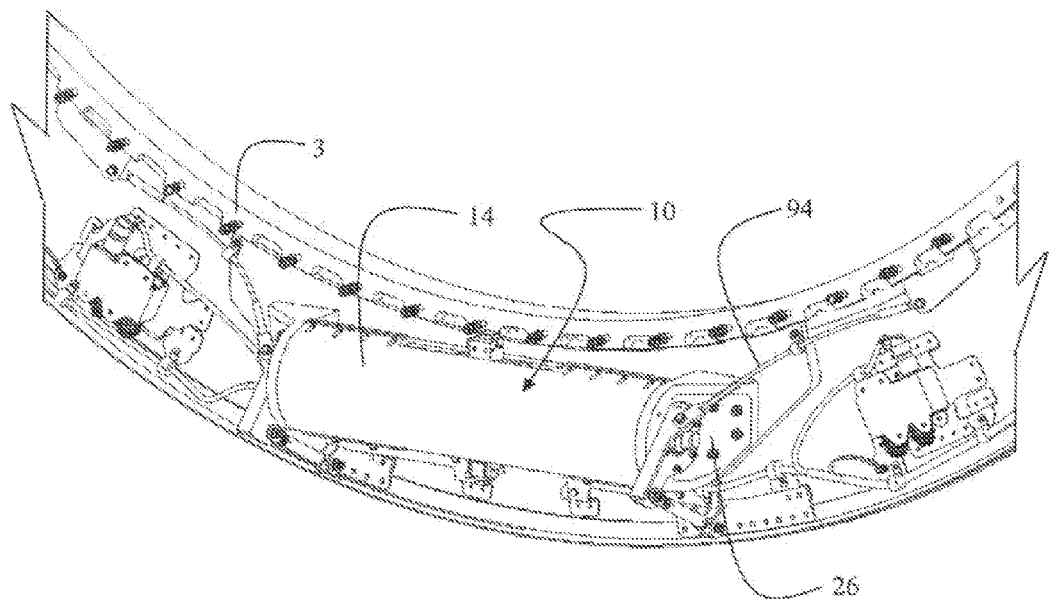
FIG. 3A is a rear right isometric view of an example embodiment of an adjustable TMD confirmation tool as mounted on the nacelle inlet bulkhead.
Figure 3B:
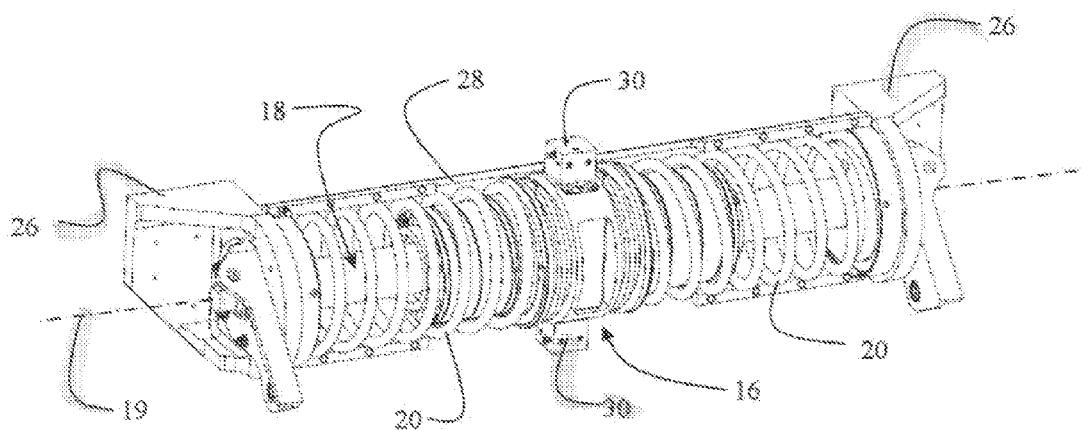
FIG. 3B is a rear left isometric view of the TMD of FIG. 3A with the outer case removed.
Figure 3C:
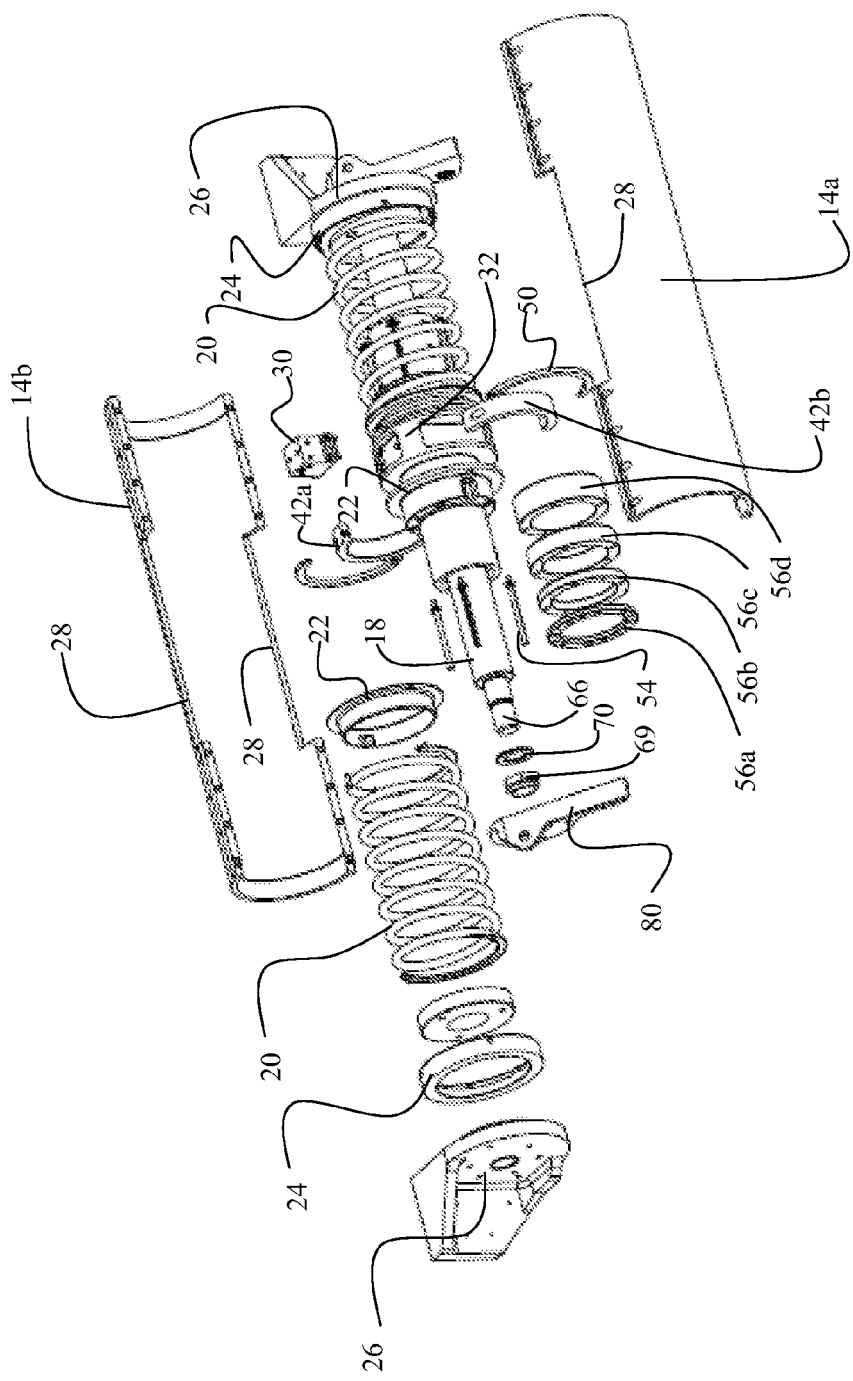
FIG. 3C is a partial exploded view of the TMD of FIG. 3A.

As shown in FIG. 3A for an example embodiment, a configuration confirmation tool TMD 10 is mounted to an inlet bulkhead 3 in an engine nacelle for a large commercial aircraft. The features described herein provide a test and evaluation tool for confirmation of the configuration, sizing, damping and orientation requirements to achieve desired aeroelastic modal damping. A case 14 houses the TMD operating components and various brackets are employed to mount the TMD to the bulkhead as will be described in greater detail subsequently. As shown in FIGS. 3B and 3C, the TMD 10 includes a translating mass buildup 16 which is supported for reciprocal oscillation on a shaft 18. Orientation of the shaft establishes a damping axis 19 for the TMD. Springs 20, concentric to the shaft and constrained with inner spring seats 22 and outer spring seats 24, resiliently constrain the translating mass buildup 16 for resonant motion response. The shaft 18 is supported by left and right end caps 26 which mount to the bulkhead 3. Case 14 has two separable halves 14a and 14b which include slotted reliefs 28 which allow upper and lower accelerometer posts 30 to protrude.

Figure 4:
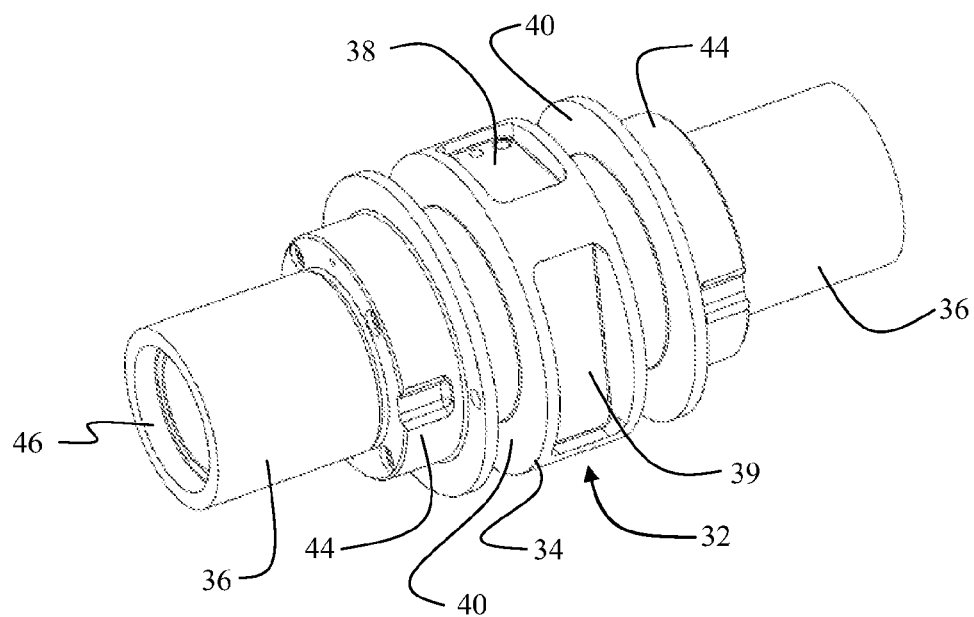
FIG. 4 is an isometric view of the primary mass.
Figure 5:
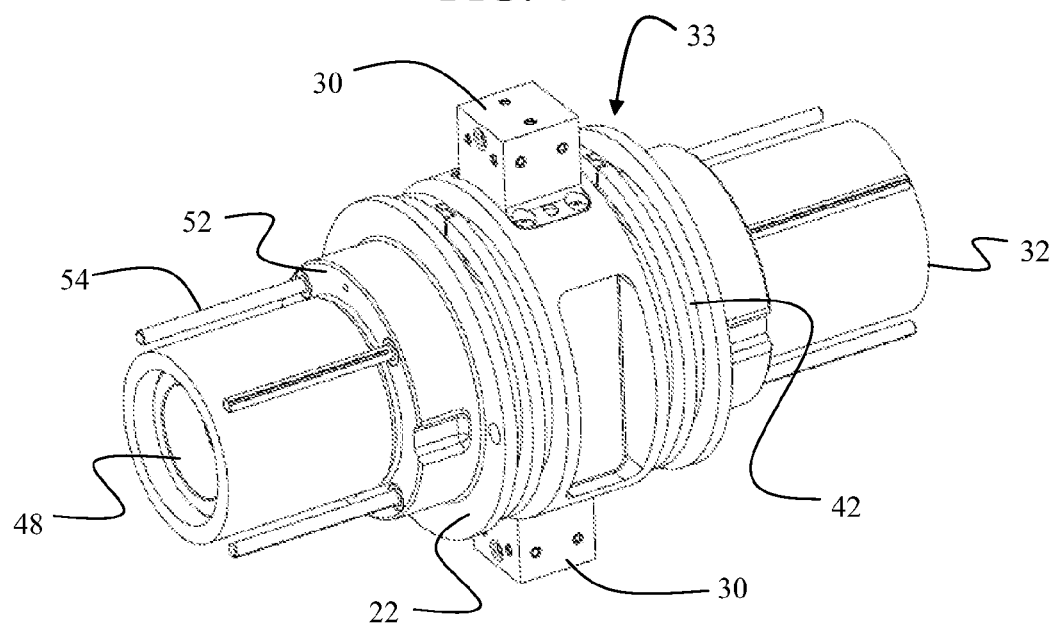
FIG. 5 is an isometric view of the primary mass assembly.

The translating mass buildup 16 includes a primary mass 32 shown in FIG. 4 which is employed in a primary mass assembly 33 shown in FIG. 5. The primary mass 32 has a central boss 34 with symmetrical cylindrical extensions 36. The central boss includes flats 38 for mounting of the accelerometer posts 30. Additionally, the central boss may include machined weight adjustment pockets 39. Flanged grooves 40 in the central boss receive magnetic rings 42 for damping to be described in greater detail subsequently. For the embodiment shown, the magnetic rings are semi-cylindrical halves 42a and 42b joined with screws 43 for mounting within the flanged grooves 40. Shoulders 44 on the primary mass receive the inner spring seats 22. The primary mass 32 has a central axial bore 46 which incorporates a low friction bearing 48 receiving the shaft 18 (as seen in FIGS. 3B and 3C).

The primary mass assembly 33 includes the primary mass 32 with magnetic rings 42 mounted in the flanged grooves 40. Interconnecting half cylindrical ring magnet spacers 50 constrain the magnetic rings in the flanged grooves and provide physical spacing of the magnets from the case halves 14a and 14b in which the translating mass buildup oscillates. Additionally, outboard faces 52 of shoulders 44 incorporate threaded bores which receive studs 54.

The translating mass buildup 16 is shown in detail in FIG. 6 includes tuning masses 56a, 56b, 56c and 56d which are removably mounted on the studs 54 concentrically over the cylindrical extensions 36 on each side of the primary mass. The tuning masses in the configuration confirmation tool version of the TMD provide adjustment for exact frequency matching in the TMD to the desired frequency of the aeroelastic mode to be damped. Lock washers 58 and jam nuts 60 secure the tuning masses to the studs.

FIGS. 7A and 7B show the end caps 26 which support the shaft 18 and mount the TMD to the aircraft nacelle inlet bulkhead. Bores 62 in lateral flanges 64 receive threaded ends 66 of the shaft 18 (as shown in FIG. 3C). As shown in FIG. 7B bushings 68 are inserted in the bores 62 to closely receive the shaft ends 66 which are constrained by nuts 69 and associated washers 70 (also seen in FIG. 3). Transverse brackets 71 extend from the lateral flanges 64 for mounting to the bulkhead. As seen in FIG. 7B, a raised disc 72 on inner surfaces 74 of the end cap receive and locate the outer spring seats 24 (as best seen in FIG. 3).

Figure 8:
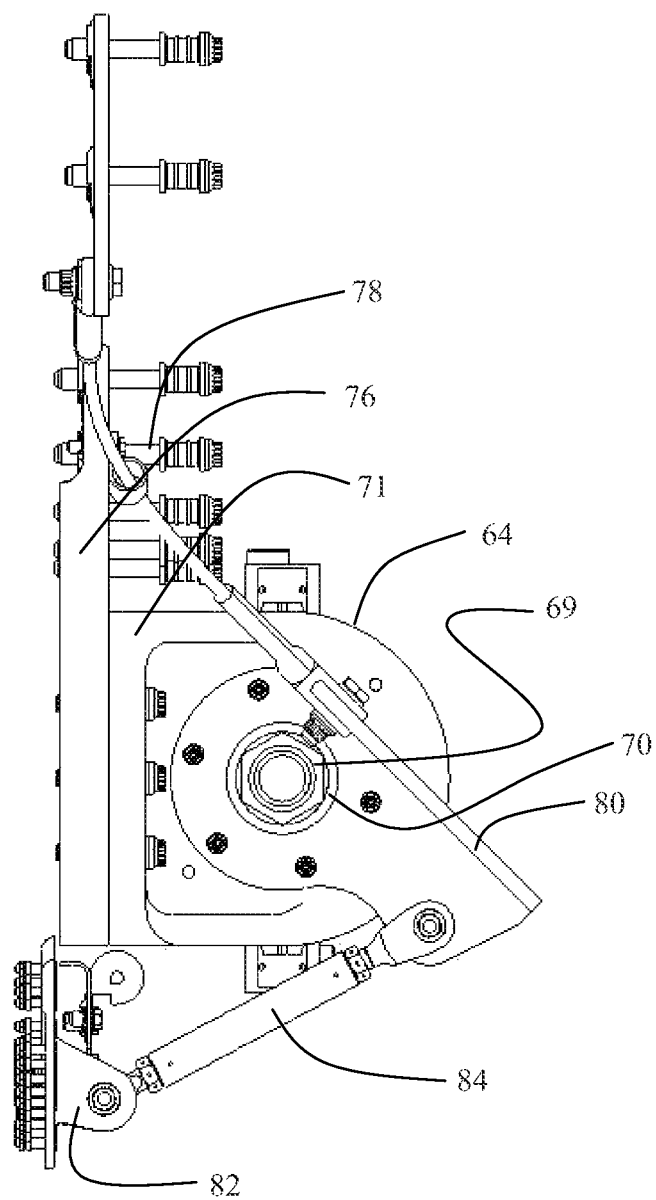
FIG. 8 is an end view of the TMD as installed showing the support blade and link assembly.

Mounting of the TMD employing the end caps is shown in FIG. 8. Transverse brackets 71 are attached to a strengthening plate 76 using fasteners 78. The plate 76 then mounts to bulkhead 3. Additional stability of the TMD is provided through blades 80 which extend from and are attached to the lateral flanges 64. Attachment of the blades 80 to link fittings 82 with link assemblies 84 provides torsional stability for the cantilevered TMD.

Figure 9:
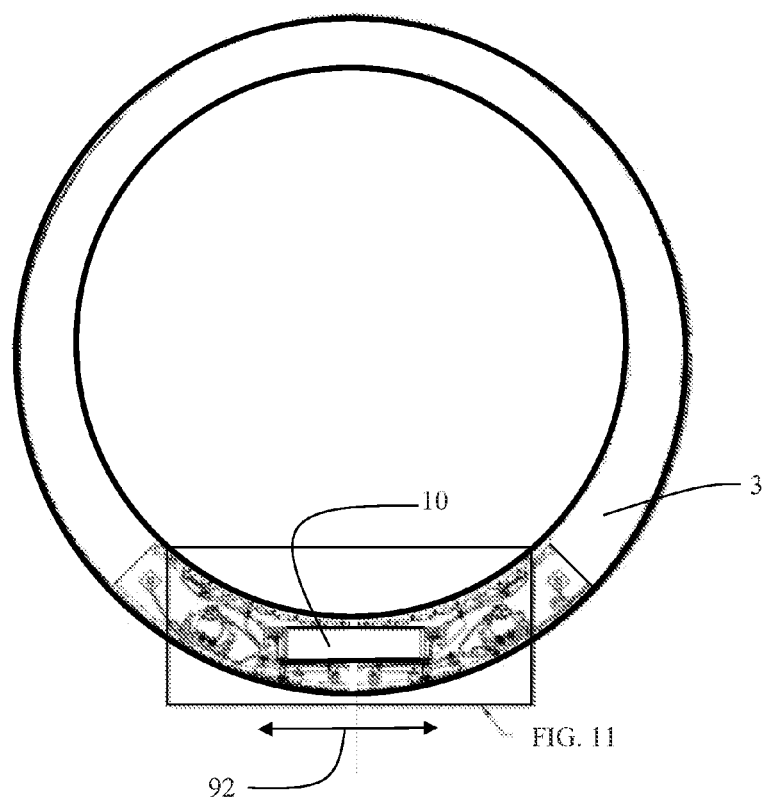
FIG. 9 is a rear section view of the nacelle bulkhead with the TMD installed.
Figure 10:
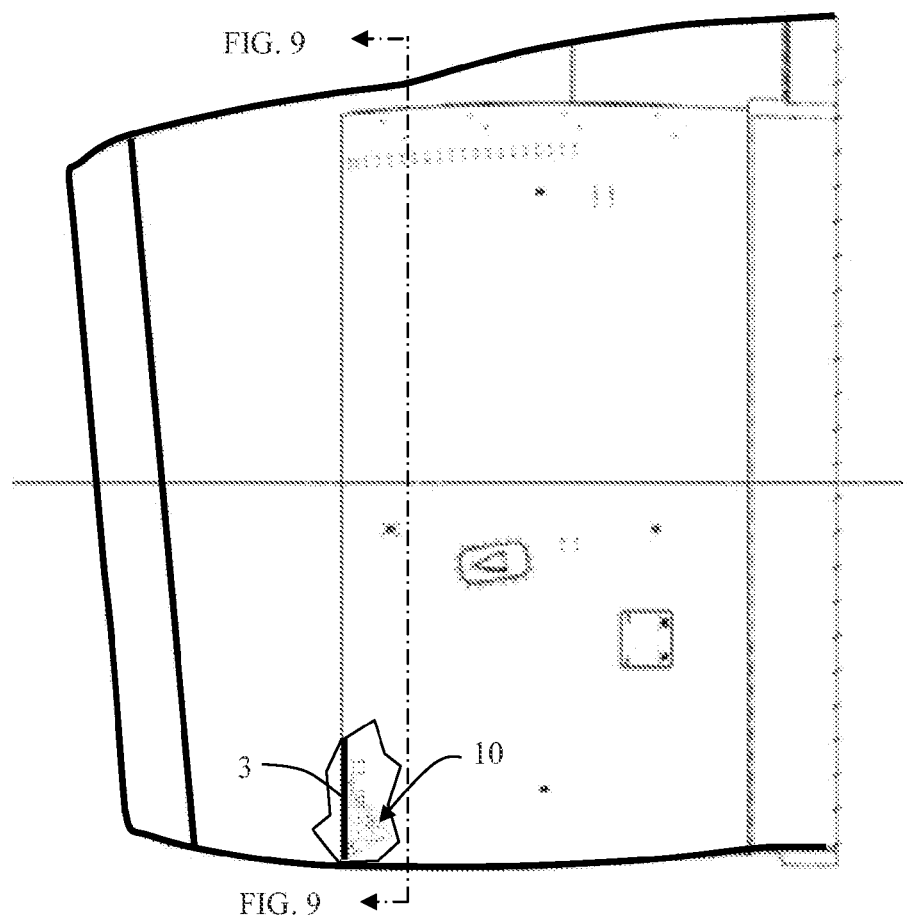
FIG. 10 is a side partial section view of the nacelle showing the TMD location as mounted and the section view line FIG. 9-FIG. 9.

Details of the location and orientation of the TMD mounting for the example embodiment are shown in FIGS. 9-13. FIG. 9 shows the inlet bulkhead 3 as a section view FIG. 9—FIG. 9 in the engine nacelle 90 seen in FIG. 10. For the embodiment shown, the TMD mass translates inboard and outboard with respect to the aircraft as represented by arrow 92 in FIGS. 9 and 11. The TMD is a damped resonant oscillator with the resonant frequency established by the total mass of the translating mass assembly 16 and the spring constants of the springs 20. Very precise tuning of the resonance can be achieved by variation of the tuning masses 56a-56d previously described. Viscous damping is accomplished for the embodiment shown by means of eddy currents developed by magnet rings 42 attached to the moving translating mass assembly 16 close to a stationary conductive metal surface of the case 14. The magnet rings are replaceable in the mass buildup for altering the eddy current interaction with the conductive surface to adjust the viscous damping level. For the described embodiment viscous damping of approximately 2-5% is achieved. In alternative embodiment, damping could be achieved by fluid flow or other means.

Figure 11:
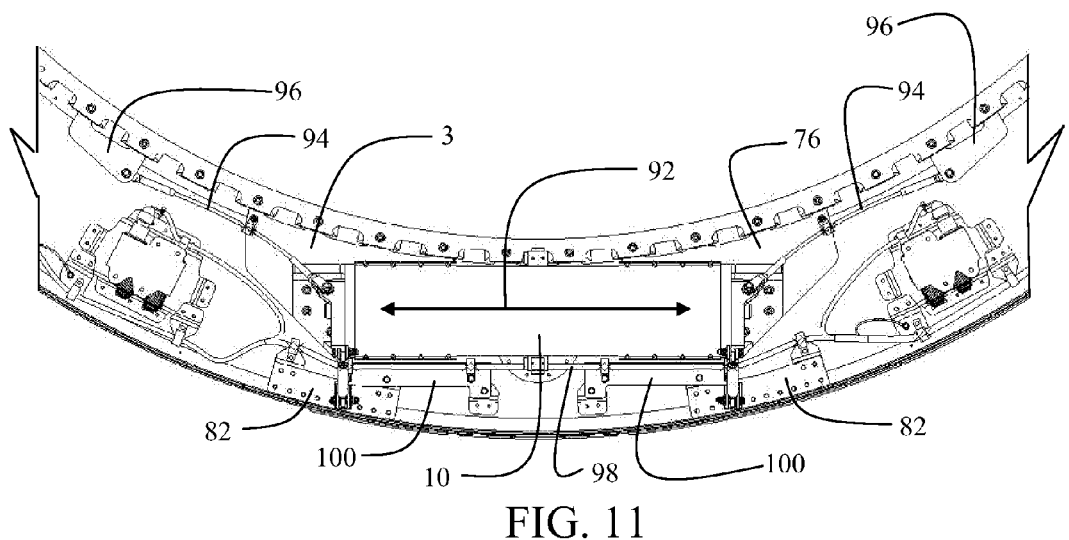
FIG. 11 is a detailed rear view of the installed TMD from view ring FIG. 11 shown in FIG. 9.
Figure 12:
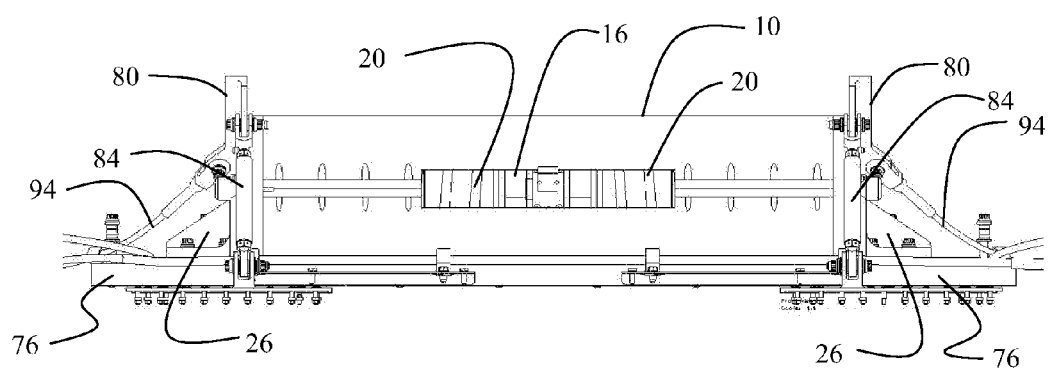
FIG. 12 is a bottom view of the installed TMD.

As seen in FIG. 11, the TMD with end caps 26 is mounted to strengthening plate 76 which is attached to the bulkhead 3. For the example embodiment, secondary retention of the TMD under destructive load conditions that might result in expulsion of the TMD from the nacelle inlet is provided by retention cables 94 which attach to the blades 80 on each side of the TMD and are routed to retention fittings 96 connected to the bulkhead 3. Additionally, cabling 98 for electrical connection to accelerometers mounted in the accelerometer posts 30 is routed through wire brackets 100.

Figure 13:
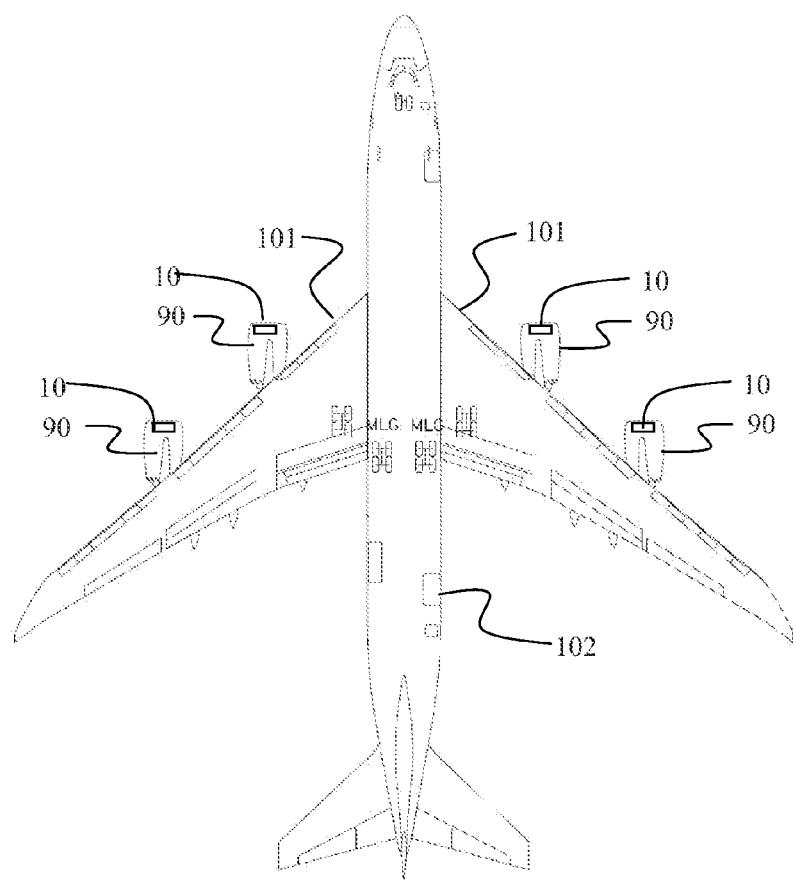
FIG. 13 is a top view of an example aircraft in which the TMD is installed for LCO suppression.

FIG. 13 shows the mounting location of the TMDs of the example embodiment in the nacelles 90 extending from the wings 101 of an example aircraft 102. For an aircraft in which whole airframe LCO with significant lateral (inboard/outboard) motion of the nacelles is present, the TMD of the described embodiment has been demonstrated to effectively reduce the growth rate of chosen aeroelastic modes and provide sufficient aeroelastic modal damping for acceptable aircraft flight characteristics.

Figure 14:
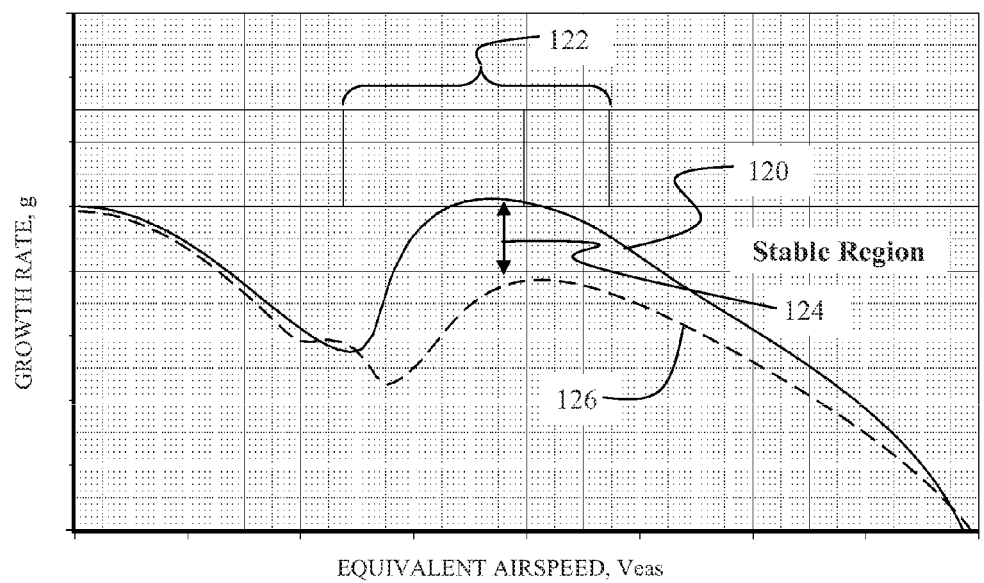
FIG. 14 is a graph of aeroelastic growth rate vs. speed with suppression by the TMD illustrated.

For the example aircraft, the aeroelastic mode of interest is shown in FIG. 14. The flutter mode at a principal resonant frequency, trace 120, shows potential positive growth rates in the operating airspeed regime 122 and required reduction for acceptable aircraft performance. Implementation of the TMD as described for the embodiment disclosed provided a significant improvement in the aeroelastic mode growth rate 124 as shown in trace 126 in FIG. 14.

Figure 15:
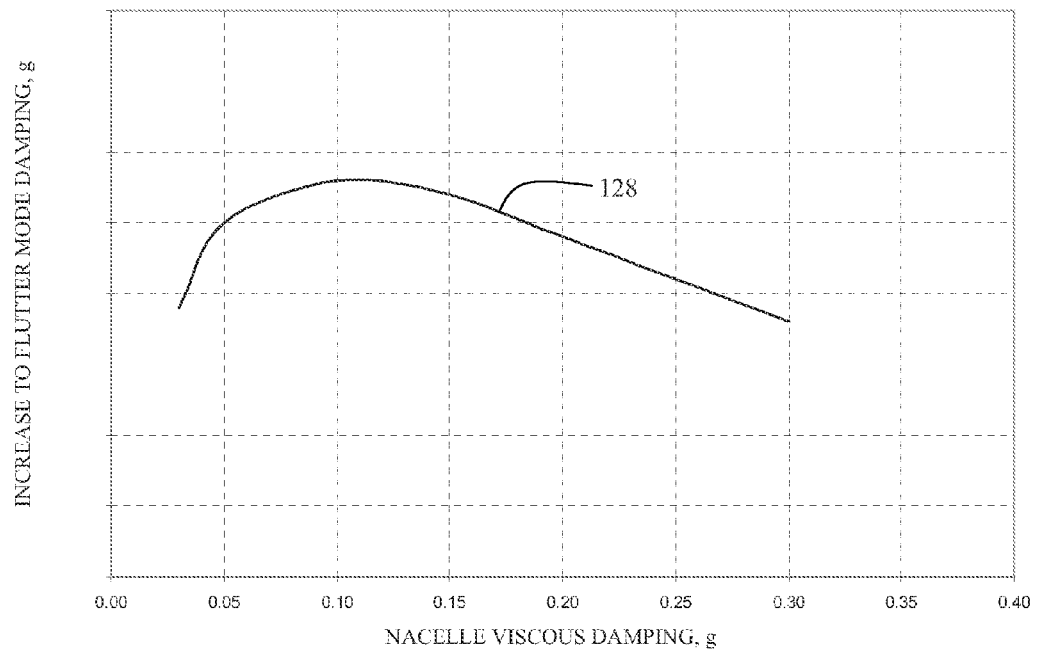
FIG. 15 is a graph of the increase in aeroelastic damping with respect to viscous damping in the TMD.

Adjustment of the viscous damping in the TMD allows enhancement of the flutter mode damping as shown in FIG. 15. Curve 128 shows increasing flutter mode damping over a range of between 0.04 to 0.28 g with a maximum increase in the flutter mode damping at approximately 0.11 g viscous damping.

Figure 16:
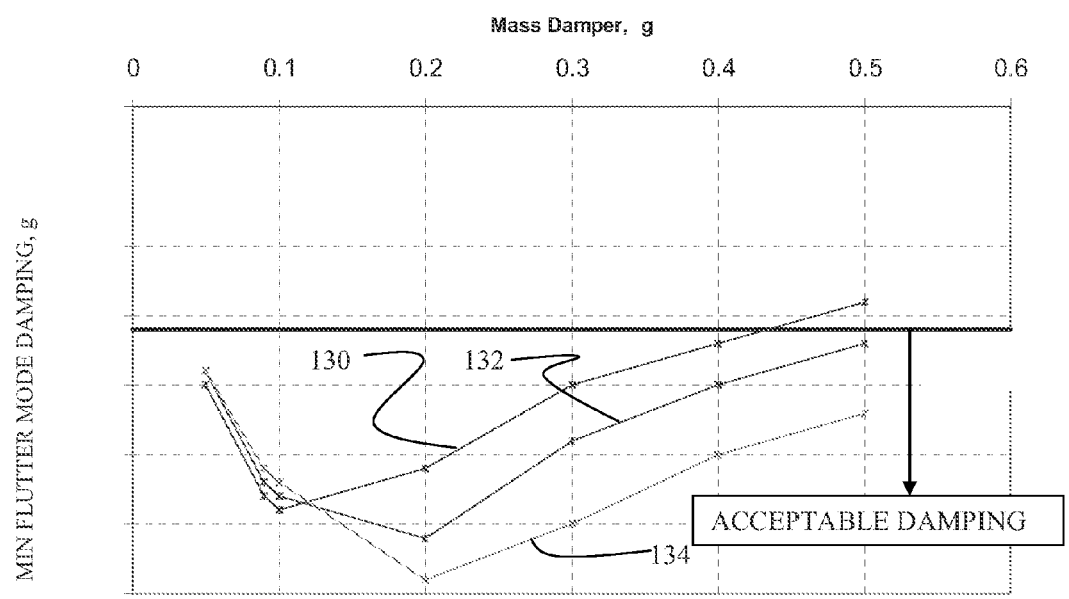
FIG. 16 is graph of flutter mode damping for three selected TMD masses.

FIG. 16 shows the flutter mode damping provided for various masses in the TMD of 75 lbs, trace 130, 100 lbs, trace 132 and 150 lbs, trace 134. A 100 lb mass provides an acceptable damping level over a full range of operating mass damper viscous damping values of 0.05 to 0.5 g.

Figure 17:
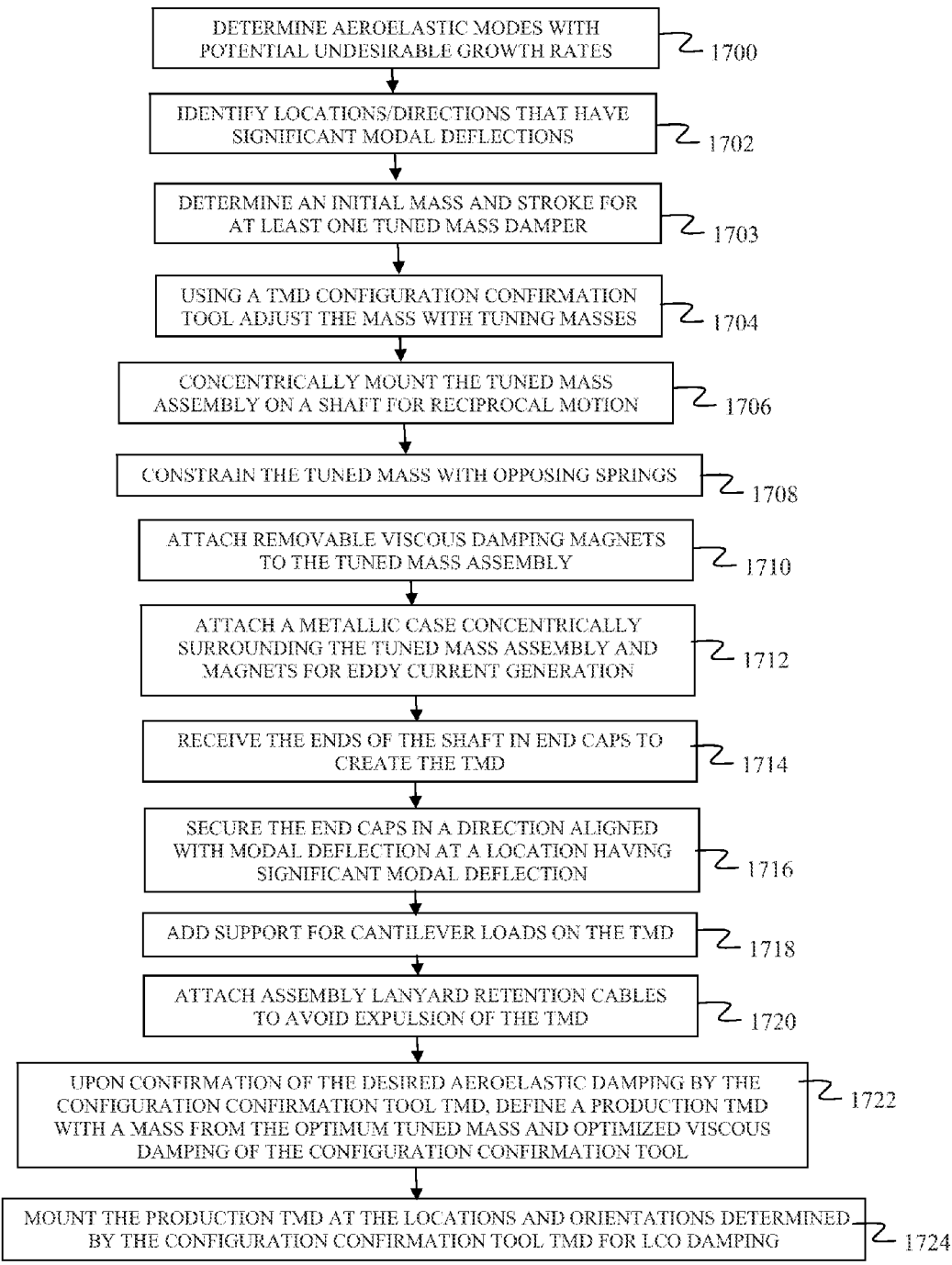
FIG. 17 is a flowchart of the method for whole airframe limit cycle oscillation damping using the TMD embodiments described.

A method for adding aeroelastic damping by employing the embodiments described herein is shown in FIG. 17. Critical aeroelastic modes with potential undesirable growth rates are determined, step 1700, and locations/directions that have significant modal deflections are identified, step 1702. An initial mass and stroke for at least one tuned mass damper is determined, step 1703. Using a TMD configuration confirmation tool, the mass is adjusted with tuning masses, step 1704. The tuned mass assembly is then concentrically mounted on a shaft for reciprocal motion, step 1706, constrained by opposing springs, step 1708. Removable viscous damping magnets are attached to the tuned mass assembly, step 1710, and a metallic case is attached concentrically surrounding the tuned mass assembly and magnets for eddy current generation, step 1712. Ends of the shaft are received in end caps to create the TMD, step 1714, and the end caps are secured in a direction aligned with modal deflection at a location having significant modal deflection, step 1716. One TMD attached to each nacelle inlet bulkhead on the aircraft with inboard/outboard orientation of the shafts to establish the damping axis for reciprocal oscillation of the masses are employed for the embodiments disclosed. Support for cantilever loads on the TMD may be added, step 1718, and assembly lanyard retention cables to avoid expulsion of the TMD may be attached, step 1720. Upon confirmation of the desired damping of LCO by the configuration confirmation tool TMD, a production TMD with a mass from the optimum tuned mass and optimized viscous damping of the configuration confirmation tool is defined, step 1722. The production TMD is then mountable at the locations and orientations determined by the configuration confirmation tool TMD for LCO damping, step 1724.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for damping aeroelastic modes, including limit cycle oscillations (LCO), comprising:
    determining a mass for a tuned mass damper (TMD) based on an aeroelastic mode in an aircraft having a potentially positive growth rate, said tuned mass damper having at least one mass assembly concentrically mounted on a shaft, said at least one mass assembly engaged by opposing concentric springs received by the end caps and reciprocating on the shaft on an axis oriented in an inboard and outboard direction, said at least one mass assembly in cooperation with said springs comprising a tuned oscillator at a frequency of the aeroelastic mode; and,
    a viscous damper engaged with the at least one mass assembly and having at least one magnet mounted on the shaft and reciprocating with the at least one mass assembly and a case having a metallic surface mounted concentrically to the shaft adjacent the at least one magnet for generation of eddy currents, said at least one magnet providing optimized damping of the aeroelastic mode in the aircraft in conjunction with the tuned oscillator; and,
    attaching at least one TMD by said shaft mounted with end caps to a bulkhead in the aircraft such that a damping axis of the tuned mass damper is substantially oriented in a direction aligned with modal deflection at a location having significant modal deflection.

2. The method for damping aeroelastic modes as defined in claim 1 wherein the step of attaching at least one TMD comprises attaching a TMD to an inlet bulkhead of at least one engine nacelle.

3. The method for damping aeroelastic modes as defined in claim 2 wherein the step of attaching a TMD to an inlet bulkhead of at least one engine nacelle comprises attaching a TMD to the inlet bulkhead of each engine nacelle in the aircraft.

4. The method for damping aeroelastic modes as defined in claim 1 further comprising employing a configuration adjustment TMD for adjusting the mass with tuning masses for a tuned mass assembly.

5. The method for damping aeroelastic modes as defined in claim 4 further comprising supporting the TMD in a cantilevered position from the bulkhead.

6. The method for damping aeroelastic modes as defined in claim 5 further comprising constraining the TMD with a lanyard cable.

7. A method for configuration confirmation for damping aeroelastic modes with a TMD having a tuned mass assembly mounted on a shaft for reciprocal motion constrained with opposing springs concentric to the shaft and received in end caps, said tuned mass assembly in cooperation with said springs comprising a tuned oscillator at a frequency of the aeroelastic mode and viscous damping magnets on the tuned mass assembly with a metallic case concentrically surrounding the tuned mass assembly and magnets for eddy current generation, comprising:
    determining a mass for the TMD based on a LCO flutter mode frequency having a potentially positive growth rate;
    adjusting the mass with tuning masses for a tuned mass assembly wherein said viscous damping magnets provide optimized damping of the aeroelastic mode in the aircraft in conjunction with the tuned oscillator;
    attaching a TMD by the end caps to an inlet bulkhead on each nacelle of an aircraft such that a damping axis of the tuned mass damper is substantially oriented in a direction aligned inboard and outboard;
    supporting the TMD in a cantilevered position from the bulkhead; and,
    constraining the TMD with a lanyard cable.

8. An aeroelastic modal damping system comprising:
    at least one mass assembly concentrically mounted on a shaft, total mass of said mass assembly determined based on an aeroelastic mode in an aircraft having a potentially positive growth rate, said shaft mounted with end caps to a bulkhead in the aircraft said at least one mass assembly engaged by opposing concentric springs received by the end caps and reciprocating on the shaft on an axis oriented in an inboard and outboard direction, said at least one mass assembly in cooperation with said springs comprising a tuned oscillator at a frequency of the aeroelastic mode; and, a viscous damper engaged with the at least one mass assembly and having at least one magnet mounted on the shaft and reciprocating with the at least one mass assembly and a case having a metallic surface mounted concentrically to the shaft adjacent the at least one magnet for generation of eddy currents, said at least one magnet providing optimized damping of the aeroelastic mode in the aircraft in conjunction with the tuned oscillator.

9. The aeroelastic modal damping system as defined in claim 8 wherein the at least one mass assembly is incorporated in a buildup and comprises:

a primary mass and adjustable tuning masses concentrically mounted on the shaft.

10. The aeroelastic modal damping system as defined in claim 9 wherein the at least one magnet in the viscous damper is mounted in the buildup with the primary mass.

11. The aeroelastic modal damping system as defined in claim 9 wherein the attachment point comprises an inlet bulkhead of a nacelle.

12. The aeroelastic modal damping system as defined in claim 11 further comprising blades extending from the end caps and connect with link assemblies to the inlet bulkhead for cantilever support.

13. The aeroelastic modal damping system as defined in claim 11 wherein the at least one mass and the viscous damper comprise a plurality of tuned mass dampers, one of said plurality mounted on each of a plurality of nacelles on an aircraft.

14. An aircraft with an aeroelastic modal damping system comprising:

a plurality of nacelles extending from the wings of an aircraft;

a plurality of tuned mass dampers (TMD) each having a primary mass concentrically mounted on a shaft and reciprocating on the shaft with opposing concentric springs engaged by end caps, the shaft supported by the end caps, said primary mass in cooperation with said springs comprising a tuned oscillator at a frequency of an aeroelastic mode of the aircraft; and, a viscous damper for the primary mass having at least one magnet mounted on the shaft and a case having a metallic surface mounted concentrically to the shaft adjacent the magnet for generation of eddy current, said magnet providing optimized damping of the aeroelastic mode in the aircraft in conjunction with the tuned oscillator;

each TMD mounted by the end caps to a respective one of the nacelles with the shaft on an axis oriented for reciprocation in an inboard and outboard direction to damp the aeroelastic mode.

* * * * *